(12) United States Patent
Jinton (10) Patent No.: US 12,059,313 B2
(45) Date of Patent: Aug. 13, 2024

(54) DENTAL ABUTMENT BLANK, METHOD OF MANUFACTURING A DENTAL ABUTMENT BLANK AND METHOD OF MANUFACTURING A DENTAL PROSTHESIS FROM SUCH A BLANK

(71) Applicant: NEOSS LIMITED, Harrogate (GB)

(72) Inventor: Lars Jinton, Mölndal (SE)

(73) Assignee: Neoss Limited, Harrogate (GB)

( * ) Notice: Subject to any disclaimer, the term of this patent is extended or adjusted under 35 U.S.C. 154(b) by 1009 days.

(21) Appl. No.: 16/464,193

(22) PCT Filed: Dec. 16, 2016

(86) PCT No.: PCT/EP2016/081580
§ 371 (c)(1),
(2) Date: May 24, 2019

(87) PCT Pub. No.: WO2018/108296
PCT Pub. Date: Jun. 21, 2018

(65) Prior Publication Data
US 2020/0289243 A1 Sep. 17, 2020

(51) Int. Cl.
*A61C 13/00* (2006.01)
*A61C 8/00* (2006.01)

(52) U.S. Cl.
CPC ........ *A61C 13/0022* (2013.01); *A61C 8/0066* (2013.01); *A61C 8/0068* (2013.01); *A61C 13/0006* (2013.01); *Y10T 428/12229* (2015.01)

(58) Field of Classification Search
None
See application file for complete search history.

(56) References Cited

U.S. PATENT DOCUMENTS

| | | | |
|---|---|---|---|
| 4,430,760 | A | 2/1984 | Smestad |
| 4,598,011 | A | 7/1986 | Bowman |
| 5,032,445 | A | 7/1991 | Scantlebury et al. |
| 5,093,179 | A | 3/1992 | Scantlebury et al. |
| 5,282,965 | A | 2/1994 | Urairi et al. |
| 5,380,328 | A | 1/1995 | Morgan |

(Continued)

FOREIGN PATENT DOCUMENTS

| | | |
|---|---|---|
| DE | 4414675 C1 | 9/1995 |
| EP | 0475077 A2 | 3/1992 |

(Continued)

OTHER PUBLICATIONS

International Preliminary Report on Patentability dated Apr. 26, 2022 for PCT/GB2020/052666; 6 pages.

(Continued)

*Primary Examiner* — Elizabeth Collister
(74) *Attorney, Agent, or Firm* — Shay Glenn LLP (57) ABSTRACT

The present invention relates to a dental abutment blank comprising a body having a first end and a second end, a connection section at the first end that is configured to be connected to a dental implant, a channel having a longitudinal axis and defining an opening at the first end and a closed end at a distance from the second end of the body; to methods for manufacturing a dental prosthesis having an angulated screw channel from said blank as well as to a dental prosthesis having an angulated screw channel manufactured from said blank.

13 Claims, 3 Drawing Sheets

(56) References Cited

U.S. PATENT DOCUMENTS

| | | | |
|---|---|---|---|
| 5,873,721 A * | 2/1999 | Willoughby | A61C 8/0048 433/172 |
| 6,131,493 A | 10/2000 | Yamamoto et al. | |
| 6,281,473 B1 | 8/2001 | Wright, III et al. | |
| 6,619,958 B2 | 9/2003 | Beaty et al. | |
| 8,556,990 B2 | 10/2013 | Bartee et al. | |
| 10,238,497 B2 | 3/2019 | Engman | |
| 2005/0102036 A1 | 5/2005 | Bartee et al. | |
| 2005/0166724 A1 | 8/2005 | Castaneda | |
| 2006/0095137 A1 | 5/2006 | Chung et al. | |
| 2006/0224242 A1 | 10/2006 | Swords et al. | |
| 2007/0037122 A1 | 2/2007 | Bassett et al. | |
| 2007/0281279 A1 | 12/2007 | Chander | |
| 2008/0044449 A1 | 2/2008 | McKay | |
| 2008/0176186 A1 | 7/2008 | Schaub | |
| 2008/0254414 A1 | 10/2008 | McGuire et al. | |
| 2008/0286720 A1 * | 11/2008 | Reed | A61C 8/0074 433/174 |
| 2010/0143071 A1 | 6/2010 | Ishikawa | |
| 2010/0167240 A1 | 7/2010 | Benzon et al. | |
| 2011/0207083 A1 | 8/2011 | Boehm-Van Diggelen | |
| 2011/0207084 A1 | 8/2011 | Kaigler | |
| 2011/0306014 A1 | 12/2011 | Conte et al. | |
| 2013/0103054 A1 | 4/2013 | Housman | |
| 2013/0288199 A1 | 10/2013 | Wen | |
| 2014/0134570 A1 | 5/2014 | Zipprich et al. | |
| 2014/0205969 A1 | 7/2014 | Martin | |
| 2015/0289905 A1 | 10/2015 | Biedermann et al. | |
| 2016/0022390 A1 | 1/2016 | Spindler et al. | |
| 2016/0030297 A1 * | 2/2016 | Abboud | A61K 6/838 433/201.1 |
| 2017/0112598 A1 | 4/2017 | Suttin et al. | |
| 2017/0333163 A1 * | 11/2017 | Terrats Bes | A61C 8/0066 |
| 2019/0167388 A1 | 6/2019 | Jinton | |

FOREIGN PATENT DOCUMENTS

| | | |
|---|---|---|
| EP | 0747017 A2 | 12/1996 |
| EP | 2053985 B1 | 5/2010 |
| EP | 2343025 A2 | 7/2011 |
| EP | 2478864 A2 | 7/2012 |
| EP | 2526893 A1 | 11/2012 |
| EP | 3378434 A1 | 9/2018 |
| GB | 2529488 B | 9/2016 |
| GB | 2560484 A | 9/2018 |
| JP | S6085739 A | 5/1985 |
| JP | 2004236767 A | 8/2004 |
| KR | 20170025213 A | 3/2017 |
| KR | 10731541 B1 | 5/2017 |
| WO | WO2005/058178 A2 | 6/2005 |
| WO | WO2008/109165 A2 | 9/2008 |
| WO | WO2011/125760 A1 | 10/2011 |
| WO | WO2013/004386 A1 | 1/2013 |
| WO | WO2013/004387 A1 | 1/2013 |
| WO | WO2013/020216 A1 | 2/2013 |
| WO | WO2013/112233 A1 | 8/2013 |
| WO | WO2014/102431 A1 | 7/2014 |
| WO | WO2014/198682 A1 | 12/2014 |
| WO | WO-2016142562 A1 * | 9/2016 ........... A61C 8/0001 |
| WO | WO2017/002111 A1 | 1/2017 |
| WO | WO2017/072066 A1 | 5/2017 |
| WO | WO2019/126819 A1 | 6/2019 |

OTHER PUBLICATIONS

Engman et al.; U.S. Appl. No. 17/770,582 entitled "Surgical membrane," filed Apr. 20, 2022.

European Search Report dated Mar. 23, 2020 for EP 16823235.3; 5 pages.

3 Shape; Impress your patients with shape TRIOS: Intraoral scanners; 12 pages as availiable on Aug. 17, 2017; retrieved from the internet (https://web.archive.org/web/20170817214137/http://www.3shape.com/products/trios/intraoral-scanners) ; on Mar. 4, 2020.

Extended European Search Report dated Oct. 10, 2016 for EP Application No. 16165389.4; 8 pages.

International Search Report and Written Opinion dated Feb. 25, 2019 for PCT/GB2018/052265; 23 pages.

Engman; U.S. Appl. No. 16/628,279 entitled "Dental implant assembly," filed Jan. 3, 2020.

International Preliminary Report on Patentability dated Jun. 18, 2019 for PCT/EP2016/081580; 10 pages.

Britannica Dictionary; Bore Definition; retrieved from the internet (https://www.britannica.com/dictionary/bore; 3 pages; Sep. 7, 2022.

Merriam Webster; Press-Fit; Definition; retrieved from the internet (https://www.merriam-webster.com/dictionary/press%20fit#:~:text=%3A%20the%20fit%20of%20a%20shaft,and%20motionless%20compare%20loose%20fit); 1 page; Oct. 20, 2023.

Engman; U.S. Appl. No. 18/263,330 entitled "Dental implant assembly," filed Jul. 27, 2023.

* cited by examiner

DENTAL ABUTMENT BLANK, METHOD OF MANUFACTURING A DENTAL ABUTMENT BLANK AND METHOD OF MANUFACTURING A DENTAL PROSTHESIS FROM SUCH A BLANK

TECHNICAL FIELD

The invention relates to a dental abutment blank, a prosthesis formed from such a blank, a dental arrangement comprising such a blank or a prosthesis and a dental implant and methods of manufacturing a blank or a prosthesis from such a blank. In more detail, the dental abutment blank allows for adjusting the angle of a screw channel in relation to the implant in accordance with the specific patient's needs.

BACKGROUND OF THE INVENTION

More commonly, individual dental abutments are manufactured in a CAD/CAM process. Using this process, the implant site is scanned for achieving a 3D-file to be used as a basis for designing dental restoration prosthesis using CAD software. Once the design is set, CAM software is used to guide a NC-controlled milling machine where the final machining is performed.

The prosthesis is machined from a blank that is clamped in the milling machine. The blanks need to be clamped so that the abutment-implant interface is orientated according to the scanned file in order for the final prosthesis to fit correctly.

Several methods are known in the art for clamping the blanks during machining. For example, the blank may be clamped in the opposite end of the implant connection.

Such a method is described in EP 2343025 A2 showing a dental implant abutment blank for tailor-made dental abutments and a method for manufacturing the same. An abutment material is provided including a cylindrical body, a grip at one end of the body, a coupling portion formed on the opposite end of the body. Furthermore, a fastening hole is formed through the grip, the body and the coupling portion. The grip is used for clamping the abutment material to a machine to manufacture a tailor-made abutment.

However, this method leaves a cut off peg after machining which must be removed manually. The screw channel must be prefabricated in the blank because the clamping method limits the access and it is not possible to machine the screw channel from the same side used for clamping.

Alternatively, the blank may be held with a screw through the abutment-implant connection. This method requires a blank with a screw channel to mount the screw through.

Such a method is for example disclosed in US 2008/0254414 A1 showing a dental abutment blank adapted for use with a dental implant, wherein the blank has at least one preformed passage extending between two opposing ends on the blank. Furthermore, a mandrel is disclosed on which the blank may be mounted on when equipped with a dental screw fixation, the mandrel having a longitudinal axis that is either generally perpendicular or parallel (and coaxial) to the at least one passage.

Recently, blanks with angled screw channels have been developed to address the problem of structural weakness resulting from a screw channel entrance located on the incisal edge of a dental prosthesis.

A blank with an angulated screw channel is for example described in WO 2013/004387 A1 showing a dental component for fixation to a dental implant having a component body with an angulated screw channel and a matching screw, wherein the screw channel wall may be curved. Furthermore, US 2016/0022390 A1 describes a milling blank with a milling section having a feed channel and a securing section having a screw channel for securing the milled abutment attachment to the dental implant. The feed channel may be angled with respect to the screw channel.

However, when mounting the blanks having an angled screw channel by the screw to the milling machine, the blanks have to be prefabricated in a large variety of angles and orientations to finally provide a fitting prosthesis. Furthermore, the channel wall thickness might possibly become too thin after milling of the milling section, thereby weakening the prosthesis.

Alternatively, some manufacturers produce individual prosthesis from a large block of titanium or cobalt chrome, usually for machining full or partial dental bridges. In this context, the abutment-implant interface is machined in the same operation. However, this usually reduces the accuracy and results in an interface with higher dimensional tolerances compared with a prefabricated interface.

SUMMARY OF THE INVENTION

Hence, there is a need and thus it is an object of the present invention, to provide a pre-fabricated blank for manufacturing a dental abutment with an angulated screw channel, the blank being versatile with regard to the final application. Furthermore, it is an object of the present invention to provide an efficient method of manufacturing a custom-tailored dental abutment.

These objects as well as others, which will become apparent from the following description of the present invention, are attained by the subject-matter of the independent claims. Some of the preferred embodiments of the present invention are defined by the subject matter of the dependent claims.

Various aspects, advantageous features and preferred embodiments of the present invention as summarized in the following contribute to solving the object of the invention.

In one aspect, the present invention provides a dental abutment blank comprising a body having a first end and a second end, a connection section at the first end that is configured to be connected to a dental implant, a channel having a longitudinal axis and defining an opening at the first end, wherein the channel extends through the connection section into the body and has a closed end at a distance from the second end of the body.

Thus, the clamping of the blank can be performed directly on or in the abutment-implant connection interface. The machining of the screw channel can be performed in the same operation as the outer contour of the prosthesis is machined. Hence, the milling machine is allowed to have full access to the blank without interfering with a clamping chuck and the prosthesis can be finished in one single operation. Therefore, providing a great number of different blanks with pre-fabricated screw channels having different angulations can be avoided. This reduces the costs of the inventory. Also, a pre-fabricated connection section that forms an abutment-implant connection interface results in improved control of the manufacturing process which enables the production of a more dimensionally accurate interface with a high level of quality.

The channel of the dental abutment blank may comprise an end section at or near the closed end having a width and an intermediate section between the end section and the first end of the body having a width greater than the width of the end section.

This allows to create an angulated screw channel for inserting a fixation screw, wherein the angulated screw channel has an enlarged portion to facilitate pivoting of the screw when advancing the screw through the angulated screw channel.

Furthermore, in the channel of the blank the end section may form a third section with a third width, the intermediate section may form a second section with a second width and the channel of the dental abutment blank may comprise a first section between the second section and the first end of the body having a first width smaller than the second width, and wherein the first width is preferably substantially the same as the third width. By means of this, a seat for the screw may be formed.

The length of the first section may be greater than or equal to the length of the connection section.

The first and/or the second, and/or the third section of the channel of dental abutment blank may be formed as cylindrical bores having a first, a second and a third diameter, respectively. This may, for instance, facilitate the manufacture of the blank.

The closed end of the channel may be formed as a conical bore section. For instance, this may facilitate the manufacture of a prosthesis having an angulated screw channel adapted to the patient's individual clinical situation with an enlarged section that eases the insertion of a screw.

Preferably, between the third section and the second section a transition section is formed that may be tapered, preferably conically tapered, or perpendicular to a central axis of the channel.

For instance, this may facilitate the manufacture of a prosthesis having an angulated screw channel adapted to the patient's individual clinical situation with an enlarged section that eases the insertion of a screw.

Preferably, between the first section and the second section a transition section is formed that may be tapered and that may form a screw seat.

Preferably, the longitudinal axis of the channel is coaxial to a central axis of the connection section. This design may, for instance, facilitate further machining.

The body may comprise a milling section that is substantially cylindrical and a connection section that preferably has a smaller outer diameter than the milling section and protrudes from the milling section. For instance, this design facilitates further machining and clamping from the bottom side, allowing the milling machine to have full access to the blank without interfering with a clamping tool, e.g. a chuck.

The connection section may comprise a structure that is configured to be engaged in a form fit manner by a connection section at the implant. For instance, this design may stabilize the connection between the finished prosthesis and the corresponding implant.

The connection section may comprise a portion having a polygonal, more preferably a hexagonal outer contour. This design may, for instance, may facilitate the orientation of the outer geometry of the prosthesis in relation to the connection section and the implant.

The blank may be made from a material, which is suitable for a dental prosthesis, more preferably from titanium, cobalt, chrome or their alloys or ceramics. A dental prosthesis from such a blank may be stable and well tolerated.

In a further aspect, the present invention provides a dental abutment blank comprising a body having a first end and a second end, a connection section at the first end that is configured to be connected to a dental implant, a first channel having a first longitudinal axis (L1) and defining a first opening at the first end, and a second channel having a second longitudinal axis (L2) and defining a second opening at or near the second end, wherein the first channel and the second channel intersect at an intersection plane, so that the second channel extends at an angle relative to the first channel to form an angulated screw channel, and wherein in the wall of the second channel a first recess is provided at an axial position at or close to the intersection plane that enlarges the second channel and that has an angled contour. For example, this design may facilitate the insertion of a screw.

A second recess may be provided at an axial position farther away than the first recess in a direction towards the second opening in the wall of the second channel and that has an angled contour. With this, the insertion of a screw might be further facilitated.

The contour of the first and the second recess may be triangular in a plane parallel to the longitudinal axis (L2) of the second recess. For instance, this embodiment may be easy to be manufactured when using a blank with a widened blind bore described above.

In a further aspect of the present invention, the first and the second channel first may have walls that face each other at an angle and opposite walls that face away from each other and wherein the first and the second recess are provided at the wall that face away from each other. Likewise, this embodiment for example may be easy to be manufactured when using a blank with a widened blind bore described above.

The first channel may comprises a first section at the first end of the body having a first width and a second section between the first section and the second channel having a second width greater than the first width. With this design, a seat configured to receive the head of a screw may be provided.

The first, and/or the second section, and/or the second channel may be cylindrical bores having a first, a second and a third diameter, respectively. The dental abutment blank with an angulated screw channel may be further be formed by a body, and/or a connection section, and/or a material as mentioned above.

In a further aspect, the present invention provides a dental prosthesis formed from a blank described above. The dental prosthesis may have an angulated screw channel adapted to the implant site of a patient and may be finished in one single operation.

In a further aspect, the present invention provides an arrangement comprising a blank or prosthesis mentioned above together with a screw, an implant, and optionally a crown.

In a further aspect, the present invention provides a method of manufacturing a dental abutment blank comprising the steps of providing a dental abutment blank comprising a body having a first end and a second end, a connection section at the first end that is configured to be connected to a dental implant, a channel having a longitudinal axis and defining an opening at the first end, wherein the channel extends through the connection section into the body and has a closed end at a distance from the second end of the body; widening the width of the first channel at a distance from the first and the second end. This methods may easily allow obtaining a dental abutment blank suitable for being prepared to a dental prosthesis having an individually adapted angulated screw channel.

In a further aspect, the present invention provides a method of manufacturing a dental prosthesis from a dental abutment blank, the blank being defined as described above comprising the steps of holding the blank at the connection section, and preferably milling the blank. This method allows the milling machine to have full access to the blank without interfering with a clamping tool.

Furthermore, the following steps may be comprised: preparing a second channel at the second end to form a screw channel together with the first channel, the second channel having a longitudinal axis L2 that is angled with respect to the longitudinal axis L1 of the first bore, wherein the preparation step of the second channel takes place before, after or during the milling step. Further to what was described above, this method may allow preparing an angulated screw channel adapted to a patient's implant site, wherein the prosthesis can be finished in one single operation together with the milling.

Additionally, the method may comprise the step of providing a centering support in the milling machine, the centering support having an outside surface that is engaging an inside surface of the connection section. This may allow clamping and simultaneously stabilizing the connecting section for milling and/or preparing the screw channel.

In a further aspect, the present invention provides a method of clamping a dental abutment blank or a dental prosthesis in a chuck, the dental blank or prosthesis being defined by any of the preceding items and the chuck comprising a centering support; the method comprising the steps of: engaging an outside surface of the connection section with at least two jaws of the chuck; engaging a wall portion of the channel at or near the second first end of the dental abutment blank or prosthesis with an outside surface of the centering support. This may allow clamping and simultaneously stabilizing the connecting section for milling and/or preparing the screw channel as described above.

DETAILED DESCRIPTION OF THE INVENTION

Figure 1:
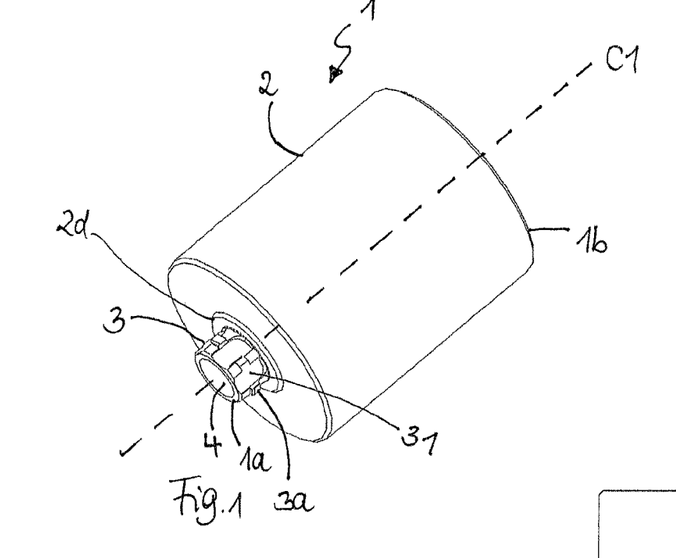
FIG. 1 shows a perspective side view of a dental abutment blank according to the invention.
Figure 2:
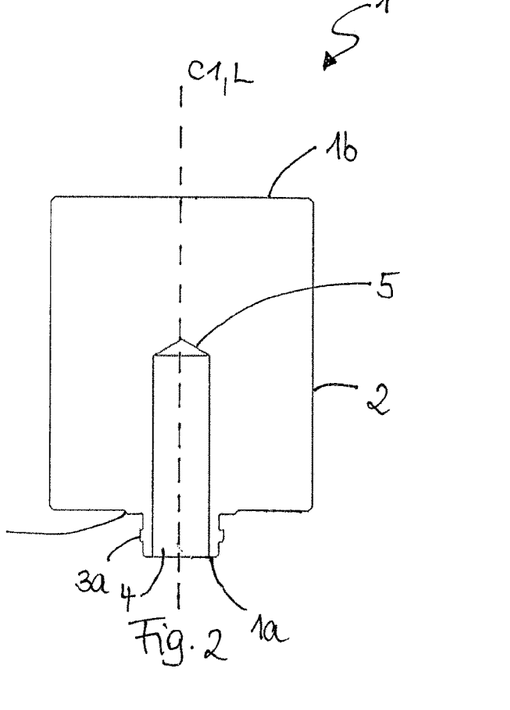
FIG. 2 shows a schematic cross sectional view of a dental abutment blank with a blind hole according to a first embodiment, wherein the section is taken in a plane including a central longitudinal axis of the blank.

A dental abutment blank according to a first embodiment is shown in FIGS. 1 and 2 in form of a single tooth replacement abutment. The dental abutment blank comprises a body 1 having a first end 1a and an opposite second end 1b. The body 1 includes at the second end 1b a milling section 2 that may be substantially cylindrical having a cylinder axis that defines a central longitudinal axis C1 of the body and further includes a connection section 3 at the first end 1a. The milling section 2 is configured to be machined to achieve the final outer geometry of the prosthesis, in particular to be milled in a milling machine. The connection section may be pre-fabricated and serves as abutment-implant connection interface. As depicted in FIGS. 1 and 2, the connection section 3 has a central longitudinal axis, that is coaxial with the cylinder axis of the milling section 2. Alternatively, the milling section 2 may be eccentric relative to the connection section 3. An outer diameter and an axial length of the milling section 2 may be greater than an outer diameter and an axial length of the connecting section 3.

As can be seen from FIG. 1, the connection section has a substantially polygonal outer contour with flat outer surface portions 31. In this embodiment, the contour is hexagonal. However, also other forms of contours are conceivable, for example a triangular, quadrangular, pentagonal, heptagonal, or octagonal. Furthermore, the connecting section 3 may comprise an engagement structure 3a that is configured to be engaged in a form fit manner by a connecting section at a dental implant (not shown). The engagement structure 3a may consist of protrusions and/or indentations at the edges of the polygon that are configured to engage corresponding recesses and/or protrusions at the connections section of the dental implant.

Optionally, a transition section 2d may be formed between the milling section 2 and the connection section 3 for abutment at the dental implant. The transition section 2d may have an outer diameter smaller than the diameter of the milling section 2 and greater than the outer diameter of connection section 3.

As shown in particular in FIG. 2, in a first embodiment, the dental abutment blank comprises a channel in the form of a blind bore 4 that defines an opening at the first end 1a and that extends completely through the connecting section 3 into the milling section 2 up to a distance from the second end 1b. The bore 4 may have a circular cross-section. However, the channel may also have a polygonal, oval, irregular or otherwise shaped cross-section. Referring to FIG. 2, the bore 4 has a longitudinal axis L that is coaxial with the central longitudinal axis C1 of the body. Preferably, the closed end 5 is located substantially in the middle of the milling section 2. Further preferred, the closed end 5 is conically shaped. The dental abutment blank 1 is configured to be machined at the milling section 2 including the forming of a screw channel for inserting the screw while being held at the connection section 3.

Figure 3:
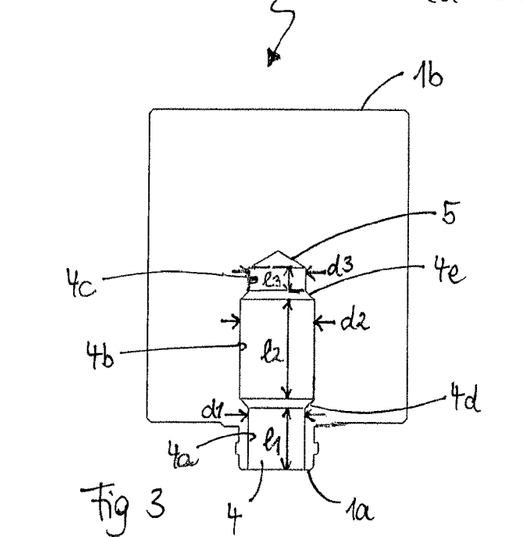
FIG. 3 shows a schematic cross sectional view of a dental abutment blank with a widened blind hole according to a further embodiment, wherein the section is taken in a plane including a central longitudinal axis of the blank.

A second embodiment of a dental abutment blank 1' is shown in FIG. 3. Equal features will not be repeated. In this embodiment, the channel has a widened intermediate section. More in detail, the bore 4 comprises three different bore sections. A first bore section 4a is formed at the first end 1a and has a diameter d1 and a length 11, a third bore section or end section 4c is formed at the closed end 5 and has a diameter d3 an a length 13, and an intermediate second bore section 4b is formed between the first bore section 4a and the third bore section 4c and has a second diameter d2 and a length 12. The second bore section 4b is widened in relation to the first and the third bore sections 4a and 4c. More in detail, the second diameter d2 is greater than the first diameter 11 and also greater than the third diameter 13. In this embodiment, the first bore section 4a extends in an axial direction through at least the whole connection section 3. The second bore section 4b has a greater length 12 than the first bore section 4a, which in turn has a greater length 11 than the third bore section 4c. However, other ratios of the lengths of the bore sections may also be contemplated depending on, for instance, the shape of the intended prosthesis or the length and shape of the fixation screw.

Between the first 4a and the second bore section 4b, a first transition section 4d may be formed that is tapered towards the first bore section 4a. In the embodiment shown in FIG. 3, the transition section 4d is conically tapered. The transition section 4d is configured to form a support surface for a head of a screw, in other words a screw seat, as will be explained in the context of an arrangement according to the invention below.

Between the second 4b and the third bore section 4c, a second transition section 4e may be formed that narrows towards the third bore section 4c. In the embodiment shown in FIG. 3, the transition section 4e narrows conically. However, also other forms or a perpendicular transition between the first 4a and the second bore section 4b are conceivable. However, also other forms or a perpendicular transition between the second 4b and the third bore section 4c are conceivable, as for example illustrated in FIG. 5 below, the abutment blank 1''' without transition section 4e representing a third embodiment 1''' of the invention.

A fourth embodiment will now be described with reference to FIG. 4. Equal features will not be repeated. The dental abutment blank 1'' comprises a first channel in the form of a first bore 4' having a first longitudinal axis L1 and defining a first opening at the first end 1a, and a second channel in the form of a second bore 4'' having a second longitudinal axis L2 and defining a second opening at the second end 1b. The first bore 4' and the second bore 4'' intersect at an intersection plane P, so that the second bore extends at an angle α relative to the first bore 4' when measured relative to the first bore axis L1. In other words, the first channel and the second channel form an obtuse angle β=180°−α. In this embodiment, α is approximately 200 and β is about 100°. However, depending on the clinical situation, also other angles may be contemplated, preferably angles α between about 10° and about 300.

Resulting from the angulation, the first 4' and the second bore 4'' have wall portions 6 and 7, respectively that face each other at the angle β, and opposite walls portions 8 and 9, respectively, that face away from each other. In the wall of the second bore 4'' a first recess 10 is provided at an axial position at or close to the intersection plane P that enlarges the second bore 4'' at the wall portion 9 facing away from the wall portion 8 of the first bore 4'. The first recess 10 may have a triangular contour in a cross sectional plane, the plane including the axis L1 and L2 and the central longitudinal axis C1. In a perspective view, the first recess 10 may comprise a conical wall section.

Furthermore, a second recess 11 may be provided at the wall portion 9 of the second bore 4'' that faces away from the wall portion 8 of the first bore 4'. The second recess 11 may be provided at an axial position farther away than the first recess 10 in a direction towards the second opening at the second end 1b. Likewise, the second recess 11 may have a triangular contour in a cross sectional plane, the plane including the axes L1 and L2 and the central longitudinal axis C1. Accordingly, the second recess 11 may comprise a conical wall section in a perspective view. As described more in detail below, the first recess 10 and the second recess 11 may be the result of the manufacturing process of the dental abutment blank in such a manner that the first recess 10 emerges from the transition of the widened second bore section 4b to the third bore section 4c in the second embodiment described with reference to FIG. 3. The second recess 11 emerges from the transition of the third bore section 4c to the closed end 5 as shown in FIG. 3.

Moreover, the first bore 4' comprises a first bore section 4a' at the first end of the body 2 having a diameter corresponding to the first bore section 4a described with respect to FIG. 3, and a second bore section 4b' between the first bore section 4a' and the second bore 4'' having a second diameter greater than the first diameter.

The blanks described above are made from a material, which is suitable for a dental prosthesis. Preferably, the blank is made from titanium, cobalt, chrome or their alloys or ceramics.

According to the present invention, the dental abutment blank embodiments described above may be manufactured as will described in the following. It should be understood that each embodiment of the dental abutment blanks described above per se represents a blank for manufacturing a customized dental prosthesis. At the same time, the embodiments represent, in chronical order where reasonable—intermediate products for the manufacture of a customized dental prosthesis to be connected to a dental implant, the prosthesis having an angulated screw channel.

First, to obtain the blank according to the first embodiment as depicted in FIG. 2, a body is provided having a cylindrical milling section 2 and a pre-fabricated connecting section 3 provided at the first end 1a that is configured to be connected to a dental implant. Then, the blind bore 4 is prepared, preferably by drilling.

Figure 4:
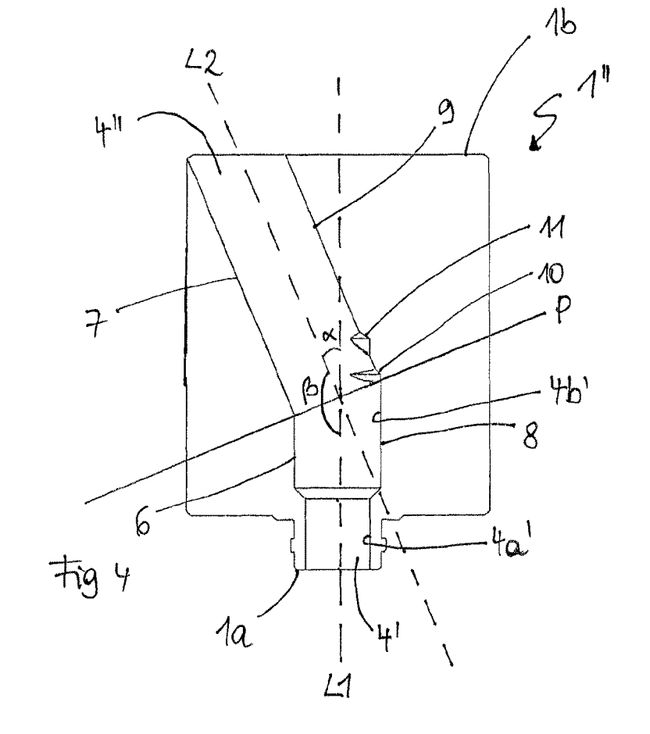
FIG. 4 shows a schematic cross sectional view of a dental abutment blank with an angulated screw channel and recesses according to a further embodiment, wherein the section is taken in a plane including a central longitudinal axis of the blank.
Figure 5:
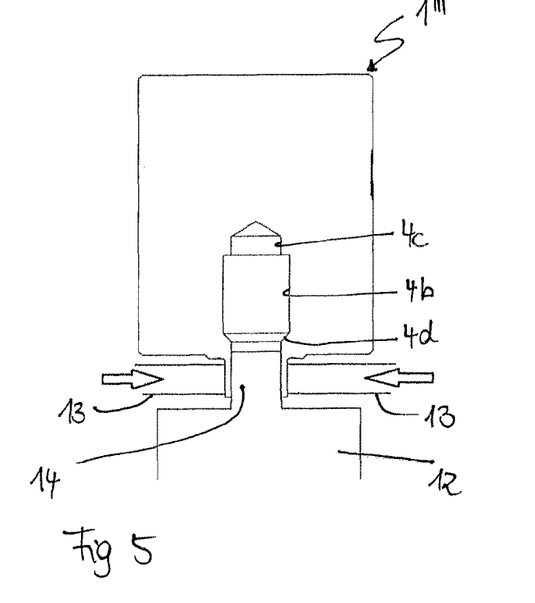
FIG. 5 shows a schematic cross sectional view of clamping a dental abutment blank according to a further embodiment in a chuck with a centering support according to the invention, wherein the section is taken in a plane including a central longitudinal axis of the blank.

To obtain the dental abutment blank as depicted in FIG. 3 or alternatively, as depicted in FIG. 4 or 5, the blind bore 4 is widened, e.g. by a turning tool, such that an intermediate second section 4b is formed as described above. Optionally, the above described transition sections 4d and/or 4e are formed—either before or after preparing the intermediate bore section 4b-between the first bore section 4a and the second bore section 4b section and/or the second bore section 4b and the third bore section 4c, respectively. The blanks described above may form pre-fabricated dental abutment blanks to be machined further to form a customized prosthesis.

Furthermore, to obtain the blank as depicted in FIG. 4, a second bore 4'' may be prepared at or near the second end 1b as described above, for example by drilling, to form the angulated screw channel.

It should be noted that also other manufacturing methods may be contemplated for manufacturing a blank according to the invention, for example additive manufacturing methods, such as laser sintering or laser melting or electron beam melting.

In a next step, either one of the blanks according to the embodiments mentioned above is held in a milling machine and is further machined, preferably milled, to obtain a dental prosthesis according to a patient's individual needs.

Preferably, the skilled person, for instance a clinician or dental technician, has scanned the implant site before milling to obtain an individual 3D-file that is further used as a basis for designing the dental restoration prosthesis using a CAD software. Once the design is set, a CAM software may preferably be used to guide an NC-controlled milling machine.

Figure 6:
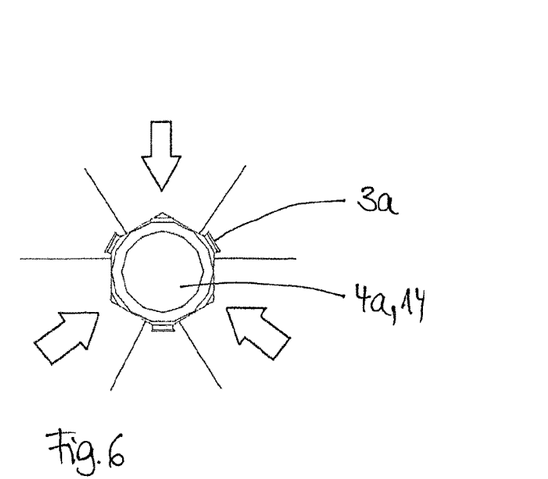
FIG. 6 shows a schematic cross sectional view perpendicular to the cross section of FIG. 5 of clamping a dental abutment blank in a chuck at a connection section of the blank.

For holding the blank in the milling machine, the connecting section 3 of the blank 1 is clamped in a clamping tool, preferably in a chuck, more preferably in a three jaw chuck 12, by engaging the hexagonal contour of the connecting section 3 with the jaws 13 of the chuck as illustrated in FIGS. 5 and 6. Preferably, a centering support 14 is provided inside the chuck 12 that engages an inside surface of the first bore 4a' of the connecting section. Preferably, the centering support 14 is configured to engage the first bore 4a in a form-fit manner. Furthermore, the centering support 14 may have a length that allows extending into the body beyond the connecting section.

Hence, the blank 1 is clamped according to the invention from the outside and simultaneously is supported and centered from inside. By means of this, it possible to hold the blank 1 firmly during machining without deforming the connecting section 3 that may have a relatively thin wall. Hence the rotation speed during machining needs not to be reduced. Furthermore, clamping on the connecting section hexagon provides a method of orientating the connecting section 3 in relation to the outer geometry of the prosthesis to be machined.

Preferably, the second bore 4" described above is prepared at any time before, during or after the milling operation. Preferably, the angle α of L2 relative to L1 is chosen such that it optimally matches the design of the prosthesis to be manufactured with regard to the wall stability of the second bore, the chewing surface and the implant site.

Figure 7:
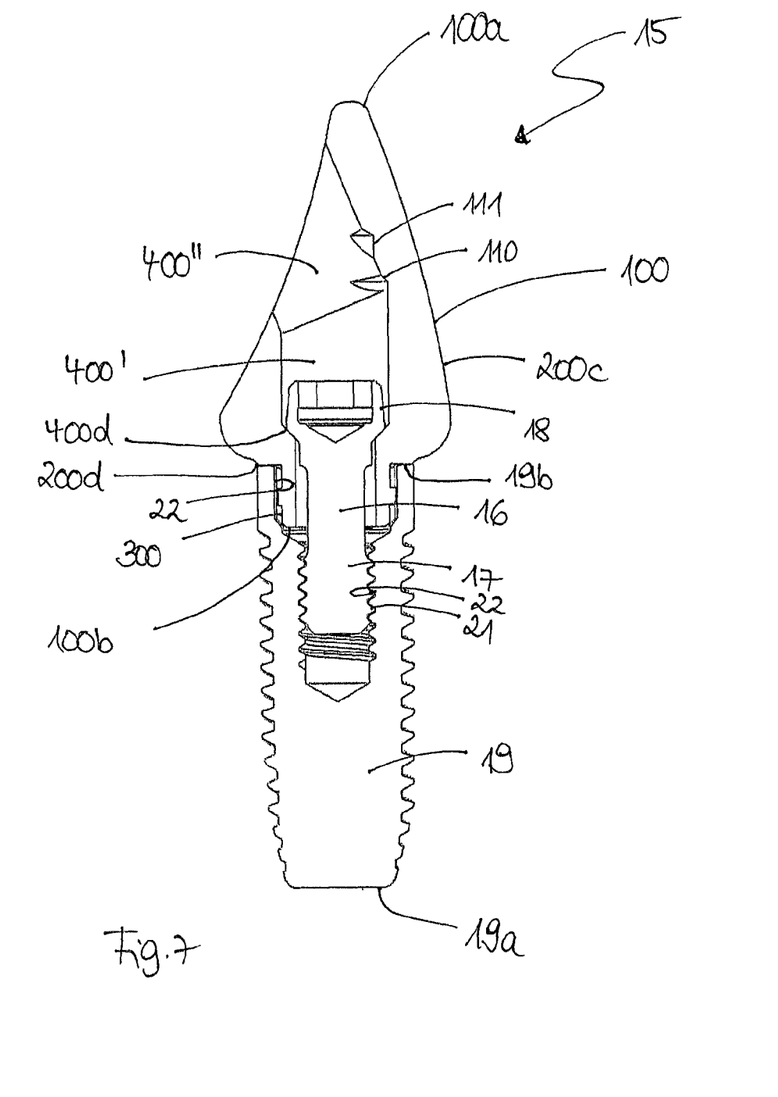
FIG. 7 shows a schematic cross sectional view of an individual dental abutment with an angulated screw channel according to the invention mounted to a dental implant, wherein the section is taken in a plane including a central longitudinal axis of the implant and the prosthesis.

With reference to FIG. 7, an arrangement 15 according to the invention is described in the following. The arrangement 15 comprises a single tooth abutment prosthesis 100, whose milling section has been milled into a milled section 200c having a tooth-like form, the prosthesis 100 having a first end 100a and a second end 100b, an angulated screw channel comprising a first bore 400' and a second bore 400" corresponding to the bores described in the context of FIG. 4 above, and further comprises a screw 16 having a shank 17 with a threaded section and a screw head 18 that is configured to be inserted trough the angulated screw channel, and an implant 19 to be implanted in a patient's jaw bone and optionally a screw or cement-retained crown (not shown) that is configured to fit onto the prosthesis 100.

The implant 19 comprises a first end 19a, an opposite second end 19b and a bore 20 defining an opening at the second end 19b, the bore 20 ending at a distance from the first end 19a and comprising an internal thread 21 that is configured to engage the threaded section of the screw 17. Furthermore, a recess 22 is provided at the opening that is configured to engage the connecting section 3 of the prosthesis 100 preferably in a form-fit manner. Furthermore, an outside surface is provided at the second end 19b of the implant 19 that engages a surface of the prosthesis 100, preferably a surface of the transition section 200d of prosthesis 100 between the milled section 200c and the connection section 300.

In more detail, the shank 17 of the screw 16 has a maximum diameter that is smaller or equal to the diameter of the smallest bore section, i.e. the first bore section 400a' of the first bore 400'. In the embodiment shown in FIG. 7, a conically tapered section 400d' is provided between the first bore section 400a' and the second bore section 400b' of the first bore 400' that tapers towards the first bore section 400a' and forms a screw seat. Accordingly, the screw head 18 preferably comprises conically tapered section that matches the conically tapered section of 400d'. Furthermore, the diameter of the screw head 18 is selected such that the screw can be inserted through the second bore 400" into the first bore 400' until the screw head rests in the screw seat 400d'.

During surgery, the implant 19 may be inserted into the jaw bone of a patient, followed by mounting the prosthesis 100 by engaging the connection section 300 with recess 22. Thereafter, the screw 16 is inserted into the prosthesis 100. As depicted in FIG. 7, the screw shank 17 has to be pivoted to follow the angulated screw channel during insertion. More in detail, when the screw head 18 arrives at the axial position of the second recess 111, the screw can be pivoted easier as the second recess provides an enlarged space for the screw head. After further advancement, the screw head 18 enters the first recess 110 which provides again space for pivoting. Hence the enlargement of the screw channel facilitates the insertion of the screw. Once the screw head 18 abuts against the screw seat 400d, the screw is tightened and locks the prosthesis 100 with respect to the implant 19.

Various modifications of the above described embodiments may be contemplated. For example, only one or more than two recesses for enlarging the screw channel may be provided. To achieve this several bore sections of the first bore, with different diameter could be provided a portion of which remains in each case when the second bore is formed.

Moreover, the screw channel consisting of the first and second channel in the form of the first and second bores may have a cross-section other than a circular cross-section. The screw seat may have another shape, for example a spherical shape. The screw head and the screw seat may or may not have a matching shape.

The second channel needs not to be angulated relative to the first channel, so that the screw channel at a whole is straight. However, the dental abutment blank is most suitable for angulated screw channels.

For the connection section any shape may be contemplated that permits holding the blank for machining. The blank may also clamped from inside the connection section i.e. from inside the first bore.

Although all embodiments described above are illustrated by reference to a single tooth replacement abutment blank and/or prosthesis, it should be understood that the dental abutment according to the invention also includes abutment blanks for bridge based prostheses. Contrary to a single prosthesis that is only mounted to one implant, the implant mounted bridge is an abutment that is mounted to multiple implants installed in the jaw bone of a patient. Depending on the clinical situation, the pre-fabricated bridge abutment blank may comprise multiple blank bodies and/or bores—either having a blind bore or already having an angulated through bore as described above.

The invention claimed is:
1. A dental abutment blank comprising:
a body having a first end and a second end;
a connection section at the first end that is configured to be connected to a dental implant; and
a channel having a longitudinal axis and defining an opening at the first end,
wherein the channel extends through the connection section into the body and has a closed end at a distance from the second end of the body,
wherein the channel comprises an end section at or near the closed end having a width and an intermediate section between the end section and the first end of the body having a width greater than the width of the end section, and wherein the body comprises a milling section that is substantially cylindrical and wherein the connection section has a smaller outer diameter than the milling section and protrudes from the milling section.

2. A dental abutment blank comprising:
a body having a first end and a second end;
a connection section at the first end that is configured to be connected to a dental implant; and
a channel having a longitudinal axis and defining an opening at the first end,
wherein the channel extends through the connection section into the body and has a closed end at a distance from the second end of the body,
wherein the channel comprises an end section at or near the closed end having a width and an intermediate section between the end section and the first end of the body having a width greater than the width of the end section, and
wherein the end section is a third section and the intermediate section is a second section and wherein the channel comprises a first section between the second section and the first end of the body having a first width smaller than the second width, and wherein the third width is substantially the same as the first width.

3. The dental abutment blank of claim 2, wherein the connection section has a length and wherein a length of the first section is greater than or equal to the length of the connection section.

4. The dental abutment blank of claim 2, wherein the first and/or the second, and/or the third section are cylindrical bores having a first, a second and a third diameter, respectively.

5. A dental abutment blank comprising:
a body having a first end and a second end;
a connection section at the first end that is configured to be connected to a dental implant; and
a channel having a longitudinal axis and defining an opening at the first end,
wherein the channel extends through the connection section into the body and has a closed end at a distance from the second end of the body,
wherein the channel comprises an end section at or near the closed end having a width and an intermediate section between the end section and the first end of the body having a width greater than the width of the end section, and
wherein the closed end of the channel is formed as a conical bore section.

6. The dental abutment blank of claim 2, wherein between the first section and the second section a transition section is formed that forms a screw seat and that is tapered or perpendicular to a central axis of the channel.

7. The dental abutment blank of claim 1, wherein the longitudinal axis of the channel is coaxial to a central axis of the connection section.

8. The dental abutment blank of claim 1, wherein the connection section comprises a structure that is configured to be engaged in a form fit manner by a connection section at the dental implant.

9. The dental abutment blank of claim 1, wherein the connection section comprises a portion having a non-rotational feature.

10. The dental abutment blank according to claim 1, wherein the blank is made from a material, which is suitable for a dental prosthesis, and selected from a group consisting of titanium, cobalt, chrome, their alloys and ceramics.

11. A dental prosthesis formed from a blank according to claim 1.

12. An arrangement comprising a blank or prosthesis as defined in claim 1, a screw, an implant, and optionally a crown.

13. A method of manufacturing a dental prosthesis from a dental abutment blank, the blank being defined as in claim 1, comprising the steps of:
holding the blank at the connection section, and milling the blank.

* * * * *